United States Patent
Lee et al.

(10) Patent No.: US 8,126,472 B2
(45) Date of Patent: Feb. 28, 2012

(54) HYBRID WIRELESS COMMUNICATION SYSTEM AND COMMUNICATION METHOD USING THE SAME

(75) Inventors: Yeon-Woo Lee, Seongnam-si (KR);
Sang-Boh Yun, Seongnam-si (KR);
Harald Haas, Bremen (DE); Khaled S. Hassan, Bremen (DE); Stephen McLaughlin, Edinburgh (GB)

(73) Assignees: Samsung Electronics Co., Ltd., Suwon-si (KR); The University Court of the University of Edinburg, Edinburgh (GB)

( * ) Notice: Subject to any disclaimer, the term of this patent is extended or adjusted under 35 U.S.C. 154(b) by 375 days.

(21) Appl. No.: 11/517,784

(22) Filed: Sep. 8, 2006

(65) Prior Publication Data
US 2007/0121531 A1 May 31, 2007

Related U.S. Application Data

(60) Provisional application No. 60/715,262, filed on Sep. 8, 2005.

(30) Foreign Application Priority Data

Jun. 21, 2006 (KR) ........................ 10-2006-0056033

(51) Int. Cl.
*H04W 72/00* (2009.01)
(52) U.S. Cl. ..................... 455/451; 455/450; 455/422.1; 370/280
(58) Field of Classification Search .................. 370/281, 370/328, 330, 331, 509, 581, 478; 455/77, 455/103, 450
See application file for complete search history.

(56) References Cited

U.S. PATENT DOCUMENTS 6,388,997 B1 * 5/2002 Scott .............................. 370/280
(Continued)

FOREIGN PATENT DOCUMENTS

EP 1 168 878 A2 1/2002
(Continued)

OTHER PUBLICATIONS

Omiyi, P.E.; Haas, H., "Maximising spectral efficiency in 3G with hybrid ad-hoc UTRA TDD/UTRA FDD cellular mobile communications," Spread Spectrum Techniques and Applications, 2004 IEEE Eighth International Symposium on , vol., no., pp. 613-617, Aug. 30-Sep. 2, 2004 URL: http://ieeexplore.ieee.org/stamp/stamp.jsp?arnumber=1371773&isnumber=29992.*

(Continued)

*Primary Examiner* — Nick Corsaro
*Assistant Examiner* — Choung A Ngo
(74) *Attorney, Agent, or Firm* — NSIP Law

(57) ABSTRACT

Disclosed is a hybrid wireless communication system and a communication method in the system. The system supports time and frequency division duplexing modes and includes a base station having a cellular communication range based on a cellular mode and mobile stations within the cellular communication range. The base station divides each available frequency resource into frames for communication, and each frame switches between a real-time service mode and a non-real-time service mode at a switching time within the frame. Communication is performed with the mobile stations within the cellular communication range via at least one of an uplink and a downlink in the real-time service mode of each frame according to the frequency division duplexing mode. Communication is performed with the mobile stations via the uplink and the downlink in the non-real-time service mode of each frame according to an ad hoc mode based on the time division duplexing mode.

12 Claims, 11 Drawing Sheets

U.S. PATENT DOCUMENTS

| | | | |
|---|---|---|---|
| 6,556,830 B1 * | 4/2003 | Lenzo | 455/450 |
| 7,366,223 B1 * | 4/2008 | Chen et al. | 375/132 |
| 2001/0055288 A1 * | 12/2001 | Uebayashi et al. | 370/331 |
| 2002/0173277 A1 * | 11/2002 | Takao et al. | 455/77 |
| 2004/0002364 A1 * | 1/2004 | Trikkonen et al. | 455/562.1 |
| 2004/0190541 A1 * | 9/2004 | Zhang | 370/431 |
| 2004/0203834 A1 * | 10/2004 | Mahany | 455/453 |
| 2004/0252659 A1 * | 12/2004 | Yun et al. | 370/328 |
| 2005/0148336 A1 * | 7/2005 | Nagato et al. | 455/450 |

FOREIGN PATENT DOCUMENTS

| | | |
|---|---|---|
| JP | 08-289360 | 11/1996 |
| JP | 09-008825 | 1/1997 |
| JP | 10-084299 | 3/1998 |
| JP | 2001-358644 A | 12/2001 |
| JP | 2003-244756 A | 8/2003 |
| JP | 2004-007457 A | 1/2004 |

OTHER PUBLICATIONS

Extended European Search Report issued on Aug. 30, 2011, in counterpart European Patent Application No. 06120383.2 (7 pages, in English).

* cited by examiner

HYBRID WIRELESS COMMUNICATION SYSTEM AND COMMUNICATION METHOD USING THE SAME

PRIORITY

This application claims priority to an application entitled "Hybrid Wireless Communication System and Communication Method Using the Same" filed with the U.S. Patent Office on Sep. 8, 2005 and assigned Ser. No. 60/715,262 and an application entitled the same filed with the Korean Intellectual Property Office on Jun. 21, 2006 and assigned Ser. No. 2006-56033, the contents of each of which are incorporated herein by reference.

BACKGROUND OF THE INVENTION

1. Field of the Invention

The present invention relates to a wireless communication system and a communication method using the same.

2. Description of the Related Art

Wireless communication systems are aimed at providing mobile stations with communication services beyond the boundaries of wired communication systems. A typical example of a wireless communication system is a cellular mobile communication system for providing voice services. A code division multiple access (CDMA) method is commonly used in the cellular mobile communication system so as to identify users. In addition to the CDMA method, a time division multiple access (TDMA) or a frequency division multiple access (FDMA) method may also be used.

In line with recent development in technologies, cellular systems have evolved to provide data services, as well as voice services. Particularly, efforts have been made to provide faster data services in cellular systems. This has resulted in development of various types of relevant methods, including orthogonal frequency-division multiplexing (OFDM). As such, an increase in data transmission rate is an important issue in current and future wireless communication systems. In order to increase the data transmission rate in wireless communication systems, frequencies must be reused properly, and interference between transmitted signals must be adjusted appropriately.

In addition to cellular mobile communication systems, there also exist other types of wireless communication systems, including a wireless local area network (LAN) system, which has been extended from a wired LAN system, an ad hoc network system, in which mobile stations replace hosts and perform communication services, and a wireless broadband (WiBro) system, in which orthogonal frequency resources are divided and used. Each wireless communication system has and is distinguished by its own wireless communication method. In other words, the type of a system depends on the wireless communication method adopted by the system.

Furthermore, each wireless communication system runs independently. This means that different types of wireless communication systems are not compatible with each other. Consequently, when a subscriber of a system wants to replace it, he must additionally purchase and use a mobile station dedicated to a desired system. This burdens the user with additional expenditure and inconvenience resulting from replacement of the mobile station.

In attempt to solve these problems, methods for using mobile stations in different systems, as well as methods for providing corresponding services, have been proposed. Particularly, methods for handing over mobile stations between different systems have been studied.

Future wireless communication systems are believed to be ubiquitous. In an ubiquitous systems, information technology is available everywhere, particularly at home, in automobiles, and even on top of a mountain. In addition, increased number of computer users connected to networks expands the scale and range of the information technology industry. However, such a ubiquitous environment cannot be realized until different networks are compatible with each other.

However, a method for providing compatibility between different types of wireless communication systems has been neither developed nor proposed yet. Therefore, a hybrid wireless communication system needs to be developed for the sake of a ubiquitous environment. In addition to compatibility, it is desired to devise a method for efficiently using resources of different wireless communication systems. Particularly, a decrease in data transmission rate must be avoided in a hybrid wireless communication system, in addition to guaranteeing a real time voice service. In order to maintain a high data transmission rate in a hybrid wireless communication system, a method for efficiently re-using frequencies is necessary, and so is a method for preventing interference. A stable voice service must also be provided.

SUMMARY OF THE INVENTION

Accordingly, the present invention has been made to solve at least the above-mentioned problems occurring in the prior art, and an object of the present invention is to provide a method and a system for performing communication by using different wireless communication methods.

Another object of the present invention is to provide a method and a system for performing communication at a high transmission rate by using different wireless communication systems.

Another object of the present invention is to provide a method and a system for performing communication with reduced interference by using different wireless communication systems.

Another object of the present invention is to provide a method and a system for performing communication at a high frequency reuse ratio by using different wireless communication systems.

Another object of the present invention is to provide a method and a system for performing communication by using different wireless communication systems so that both real-time and non-real-time services can be provided efficiently.

In order to accomplish these objects, there is provided a communication method in a hybrid wireless communication system supporting a time division duplexing mode and a frequency division duplexing mode, the system having a base station having a cellular communication range based on a cellular mode and mobile stations within the cellular communication range, the method including dividing each available frequency resource into frames and setting each frame so that the frame switches between a real-time service mode and a non-real-time service mode at a switching time within the frame; communicating with the mobile stations within the cellular communication range via at least one of a uplink and a downlink in the real-time service mode of each frame according to the frequency division duplexing mode; and communicating with the mobile stations via the uplink and the downlink in the non-real-time service mode of each frame according to an ad hoc mode based on the time division duplexing mode.

In accordance with another aspect of the present invention, there is provided a hybrid wireless communication system supporting a time division duplexing mode and a frequency division duplexing mode, the system including a base station having a cellular communication range based on a cellular mode and mobile stations within the cellular communication range, wherein the base station divides each available frequency resource into frames for communication, each frame switches between a real-time service mode and a non-real-time service mode at a switching time within the frame, communication is performed with the mobile stations within the cellular communication range via at least one of a uplink and a downlink in the real-time service mode of each frame according to the frequency division duplexing mode, and communication is performed with the mobile stations via the uplink and the downlink in the non-real-time service mode of each frame according to an ad hoc mode based on the time division duplexing mode.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
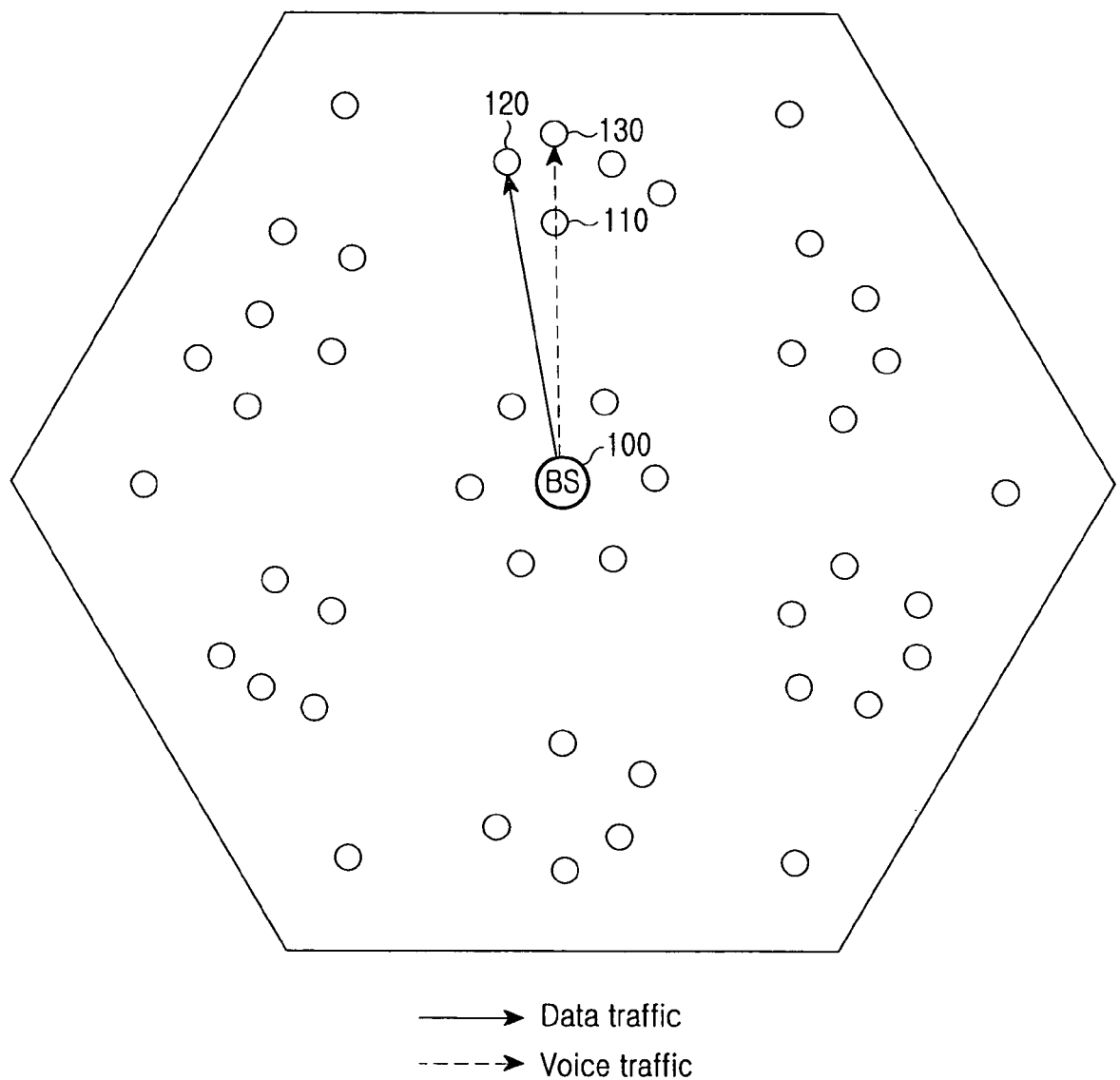
FIG. 1 is a diagram showing data and voice services provided by a base station of a cellular system.

FIG. 1 is a diagram showing data and voice services provided by a base station of a cellular system. For convenience of description, it is assumed in the following description that the cellular system shown in FIG. 1 is a conventional CDMA mobile communication system and has a hexagonal cell type base station range.

Referring to FIG. 1, a base station 100 is located at the center of the cell, and all circles within the range of the base station are mobile stations. Among the mobile stations, a mobile station 120 for receiving data traffic and a mobile station 130 for receiving voice traffic will now be described. As shown in FIG. 1, the base station 100 generally allocates more resources and higher power to the mobile station 120 for receiving data traffic so that it is provided with data services at a high data transmission rate. In addition, resources and power necessary for receiving voice traffic are allocated to the mobile station 130 for receiving voice traffic so that it is provided with voice services. When the mobile stations 120 and 130 for receiving data and voice services, respectively, are adjacent to each other, as shown in FIG. 1, severe interference may occur between them. This means that higher power is necessary. Particularly, not only the mobile station 120 for receiving data services, but also the mobile station 130 for receiving voice services require higher power as the distance from the base station 100 to the mobile stations 120 and 130 increases. This causes severe interference in relation to adjacent mobile stations. In summary, a large amount of resources are consumed to provide a high transmission rate and excellent service quality.

Such a problem is not limited to CDMA cellular systems, but is common in FDMA-type and TDMA-type systems. The overall construction and operation of the present invention will now be described.

It is assumed that, in addition to a cellular system, the present invention uses a system for communicating by using an ad hoc network. When resources are used in the present invention, both TDD (Time Division Duplexing) and FDD (Frequency Division Duplexing) modes are adopted. The present invention can provide services in an asymmetric or symmetric mode between transmitting and receiving ends. The present invention supports the asymmetric mode by using a time slot scaling algorithm. Based on these features, the present invention provides a wireless communication system supporting both cellular and ad hoc schemes, which are different wireless communication schemes, while increasing the resource reuse ratio and minimizing interference. The wireless communication system and communication scheme according to the present invention will be described later in more detail with reference to the accompanying drawings. The present invention will be described with regard to data traffic as a representative service of non-real-time services, as well as voice traffic as a representative service of real-time services. This means that, in the following description, data traffic is a non-real-time service, and voice traffic is a real-time service.

Figure 2:
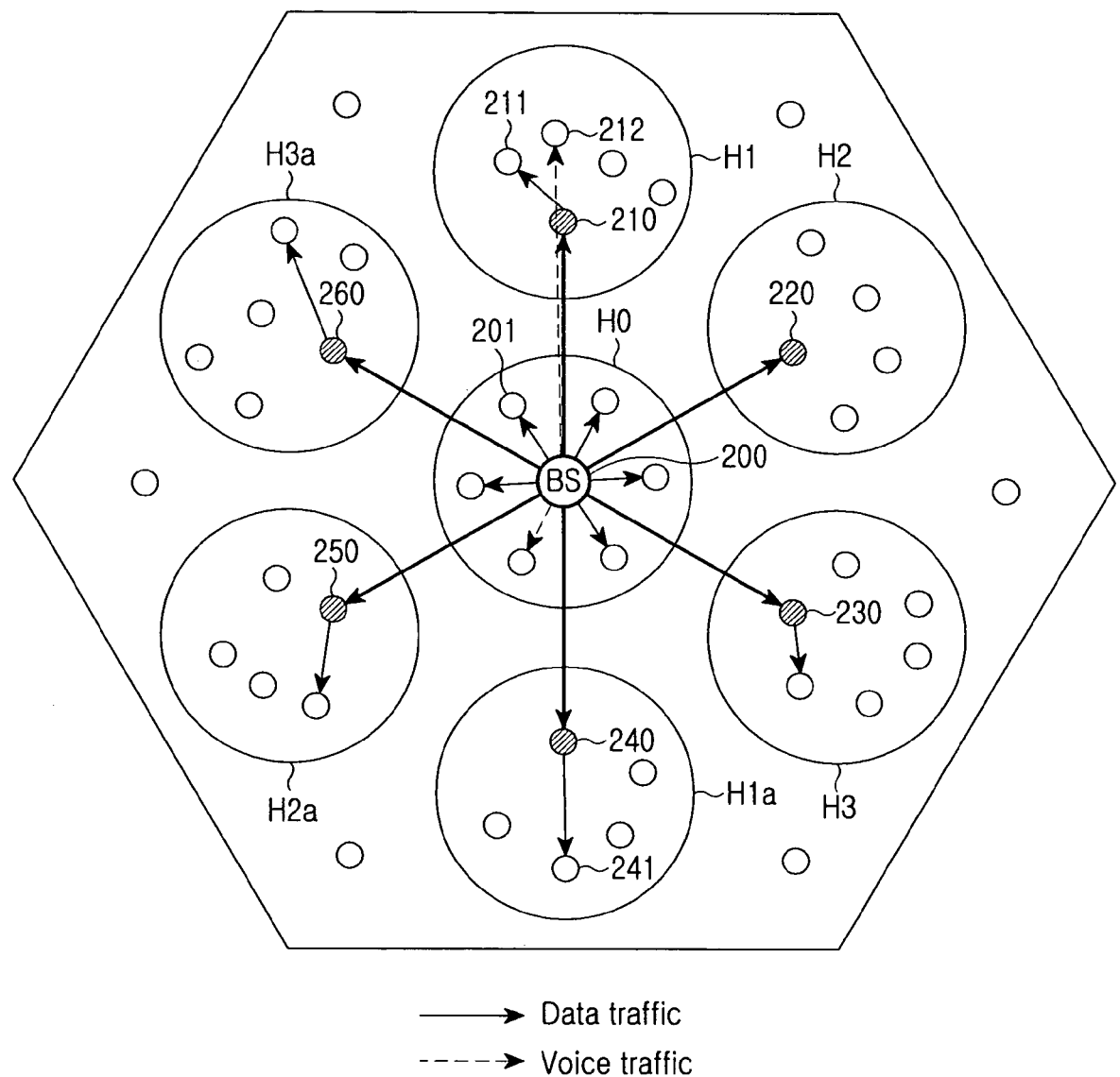
FIG. 2 is a diagram showing a communication scheme of a hybrid wireless communication system according to the present invention.

FIG. 2 is a diagram showing a communication scheme of a hybrid wireless communication system according to the present invention.

The base station 200 as shown in FIG. 2, is a base station for a cellular-type system. This means that the base station 200 has a hexagonal cell type coverage range. Small circles inside the range correspond to mobile stations which are receiving or capable of receiving services from the base station 200. It is assumed that the mobile stations are hybrid mobile stations capable of supporting both cellular and ad hoc type services. However, the mobile stations are not necessary able to support ad hoc type services according to the present invention, and any type of mobile stations may be used as long as they can support FDD and TDD modes. For convenience of description, it is assumed in the following that the mobile stations support cellular and ad hoc type services.

Depending on the distance from the base station to the mobile stations, the degree of closeness among the mobile stations, and the positional relationship among the closely located mobile stations, different satellite cells H0, H1, H2, H3, H1a, H2a, and H3a exist, as shown in FIG. 2. When data traffic is transmitted to a satellite cell, a mobile station of the satellite cell, which acts as a host, receives the data traffic. Such a mobile station of each satellite cell, which acts as a host, will hereinafter be referred to as a gateway. Referring to FIG. 2, the satellite cell H0 acts as the host of the base station 200, which has a hexagonal cell type service range, i.e. coverage range in a cellular mode.

When data traffic is to be transmitted to a specific mobile station according to the present invention, the data traffic is first transmitted to the host of a satellite cell, in which the mobile station is located, and the host forwards the data traffic to the mobile station, as shown in FIG. 2. This procedure will be described in more detail by comparison with that shown in FIG. 1. In order to transmit data to a mobile station 211, which is to receive data traffic, the base station 200 transmits data to a host mobile station 210 of a first satellite cell H1, to which the mobile station 211 belongs. In this case, the destination of the data transmitted to the host mobile station 220 must be the mobile station 211, which is to receive data traffic. Upon receiving the data, the host mobile station 210 of the first satellite cell H1 transmits the data to the destination mobile station 21 directly or via another mobile station. This completes data traffic transmission. A detailed description of the data transmission will be given later with reference to relevant drawings.

In the case of voice traffic, the base station directly transmits it to a mobile station. This procedure will be described in more detail by comparison with that shown in FIG. 1. The base station 200 directly transmits voice traffic to a mobile station 212, which is provided with voice traffic services. Particularly, the host mobile station 210 of the first satellite cell H1 does not mediate the voice traffic, in contrast to the case of data traffic. As such, voice traffic is transmitted in the same manner as conventional cellular systems.

Figure 3:
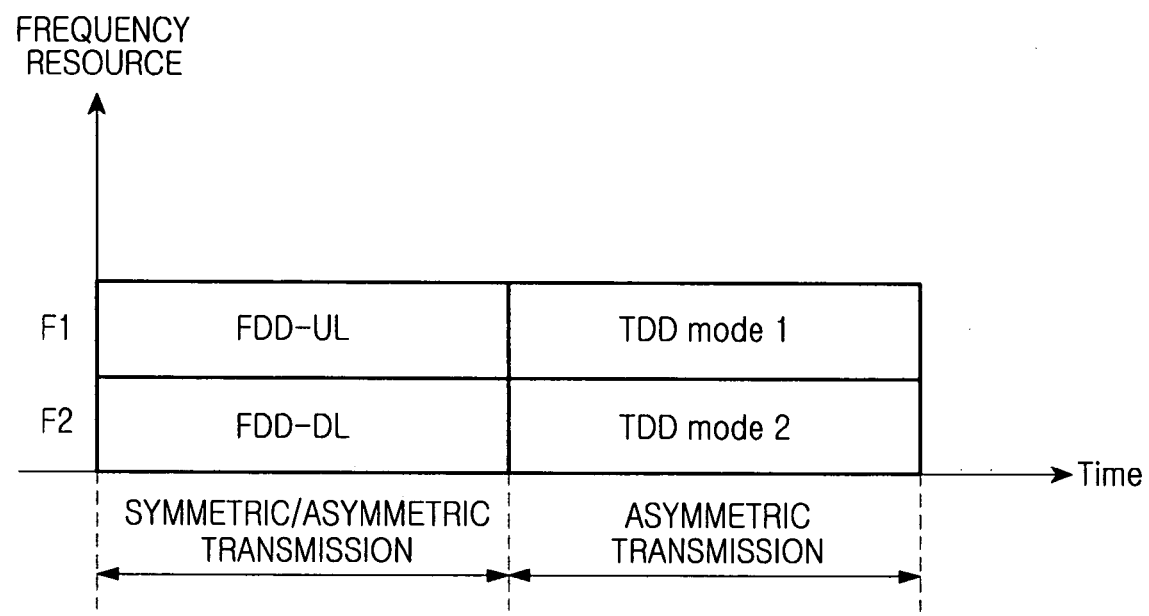
FIG. 3 shows an example of resource utilization in a system according to the present invention.

FIG. 3 shows an example of resource utilization in a system according to the present invention.

For convenience of description, only two frequency resources, particularly, first and second frequency resources F1 and F2 are shown in FIG. 3. Both frequency resources F1 and F2 have the same frame length, within which FDD and TDD modes are supported.

Resources for providing voice traffic, which is a real-time service, will now be described. As shown in FIG. 3, the first and second frequency resources F1 and F2 support symmetry or asymmetry in FDD-mode transmission/reception so that voice traffic is transmitted (i.e. a real-time service is provided). To this end, the first and second frequency resources F1 and F2 are allocated to an uplink and a downlink, respectively, and data is transmitted/received only for a symmetric and asymmetric service transmission time within a frame.

Resources for providing data traffic, which is a non-real-time service, will now be described. As shown in FIG. 3, the first and second frequency resources F1 and F2 have a TDD mode for asymmetric transmission. Particularly, the TDD mode corresponds to a resource range for providing an asymmetric service. This means that resources are allocated in the TDD mode so that the mobile stations and the base station are operated in an ad hoc mode for data transmission. Resource allocation for data services in the TDD mode will be described later in more detail with reference to FIGS. 4A to 4C.

When a specific frequency resource is allocated, as shown in FIG. 3, the FDD mode switches to the TDD mode at a point of time, which will hereinafter be referred to as a switching point. The switching point exists within a frame, the size of which may vary depending on the system requirement. In addition, the location of the switching point within the frame depends on the amount of traffic necessary for real-time and non-real-time services. Particularly, when more real-time services are requested, transmission is performed in the TDD mode for a shorter time and, when less real-time services are requested, transmission is performed in the TDD mode for a longer time. It has been assumed that the switching point varies depending on the real-time services, because real-time services generally have higher priority than non-real-time services. However, it is also possible to consider the priority of traffic first, regardless of the type of services, and vary the switching point based on the priority, which determines which type of service is to be allocated.

The base station must broadcast the switching point to all mobile stations within the cell so that they are aware of it. To this end, a base station may be adapted to receive the switching point information via a common or broadcast channel. When the switching point is substantially fixed, the base station can update the mobile stations when the switching point varies.

In summary, when the system is operated as shown in FIG. 2 and resources are allocated and distributed as shown in FIG. 3, interference between voice traffic (real-time service) and data traffic (non-real-time service) decreases. This guarantees an excellent service quality.

Reference to FIGS. 2 and 3 draws a distinction between FDD and TDD modes, which correspond to cellular and ad hoc modes, respectively. Characteristics of the FDD and TDD modes will now be described.

In the FDD mode, the base station 200 directly communicates with mobile stations. This means that the base station 200 covers a large range. Particularly, the base station 200 covers the entire hexagonal cell. For this reason, the FDD mode is suitable for low-speed voice traffic transmission or real-time services, rather than high-speed data traffic transmission. A typical example is the above-mentioned voice service. In the FDD mode, the uplink and downlink must be substantially symmetric to each other. However, symmetry is not needed when a low-speed data traffic service is provided.

The TDD mode will now be described. In the TDD mode, the base station 200 does not directly communicate with mobile stations, but transmits data in a multi-hop mode. Particularly, the base station 200 has a node, e.g. gateway shown in FIG. 2, for relaying data between the base station 200 and the mobile stations. The base station 200 may have another relay node between the gateway and a destination node. The arrangement of relay nodes is determined so as to improve the efficiency in transmitting data traffic in the ad hoc mode. This means that, since high-speed data transmission is necessary in the TDD mode, the transmission rate of data traffic determines the number of nodes. It will be assumed that the gateway and the destination node directly communicate with each other, and use of a relay node between the gateway and the destination node will be described later.

In the TDD mode, data traffic is transmitted as in the case of an ad hoc network. This means that the transmission range is less than in the case of a cellular mode. Particularly, data traffic communication occurs within a number of satellite cells H0, H1, H2, H3, H1a, H2a, and H3a, as shown in FIG.

2. In this case, the uplink and downlink may have asymmetry. This is because, in the case of data traffic, a greater amount of traffic is commonly transmitted via a specific link. When the same amount of traffic is transmitted in both directions, the uplink and downlink may have symmetry.

Figure 4A:
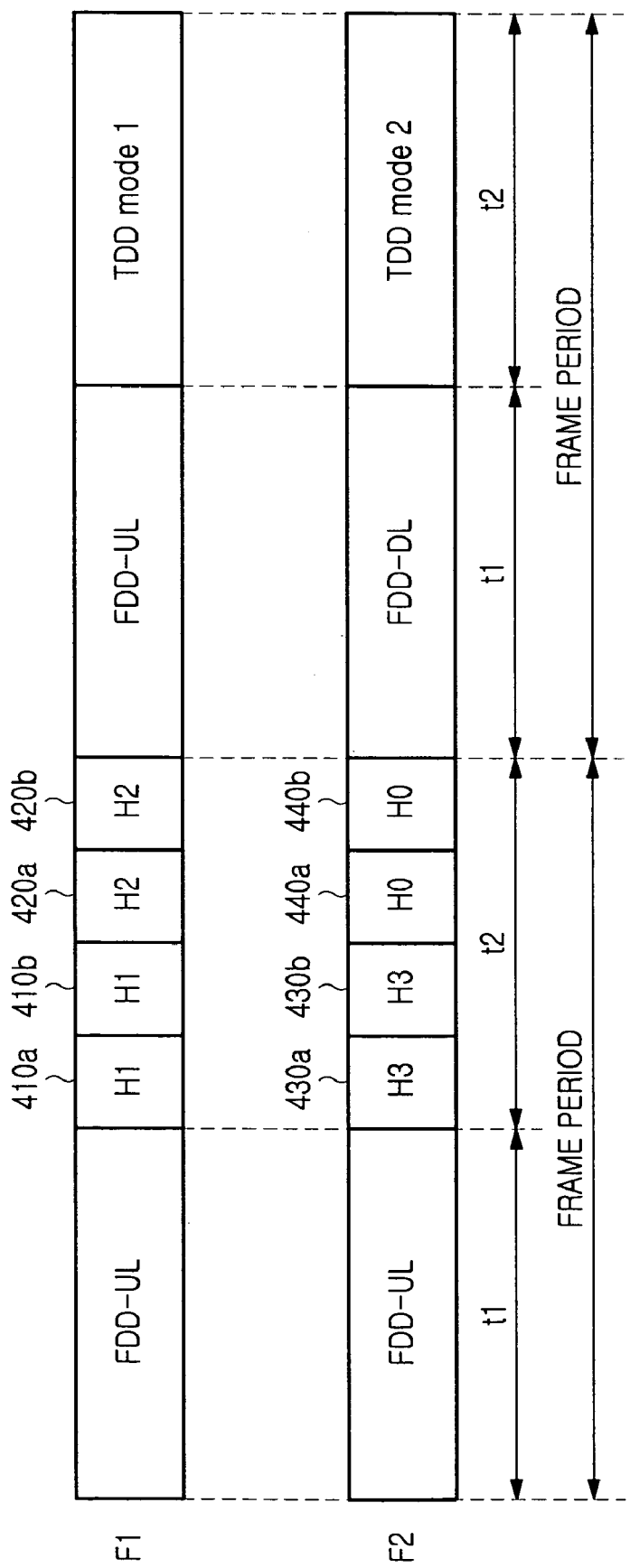
FIG. 4A shows a method for allocating a TDD-mode resource to a satellite cell when resources are allocated as shown in FIG. 3.

FIG. 4A shows a method for allocating a TDD-mode resource to a satellite cell when resources are allocated as shown in FIG. 3.

FIG. 4A illustrates an example of allocation of resources to respective satellite cells H0, H1, H2, and H3 within a specific frame period. Particularly, in the case of a first frequency resource F1, resources 410a and 410b are allocated to the first satellite cell H1 in two time ranges, and resources 420a and 420b are allocated to the second satellite cell H2 in two time ranges. In the case of a second frequency resource F2, resources 430a and 430b are allocated to the third satellite cell H3 in two time ranges, and resources 440a and 440b are allocated to the $0^{th}$ satellite cell H0 in two time ranges. Resources are allocated in the same manner in following frames. The time period of two time resources 410a and 410b, which have been allocated to the first satellite cell H1, may be identical or different. This applies to other satellite cells H0, H2, and H3.

Figure 4B:
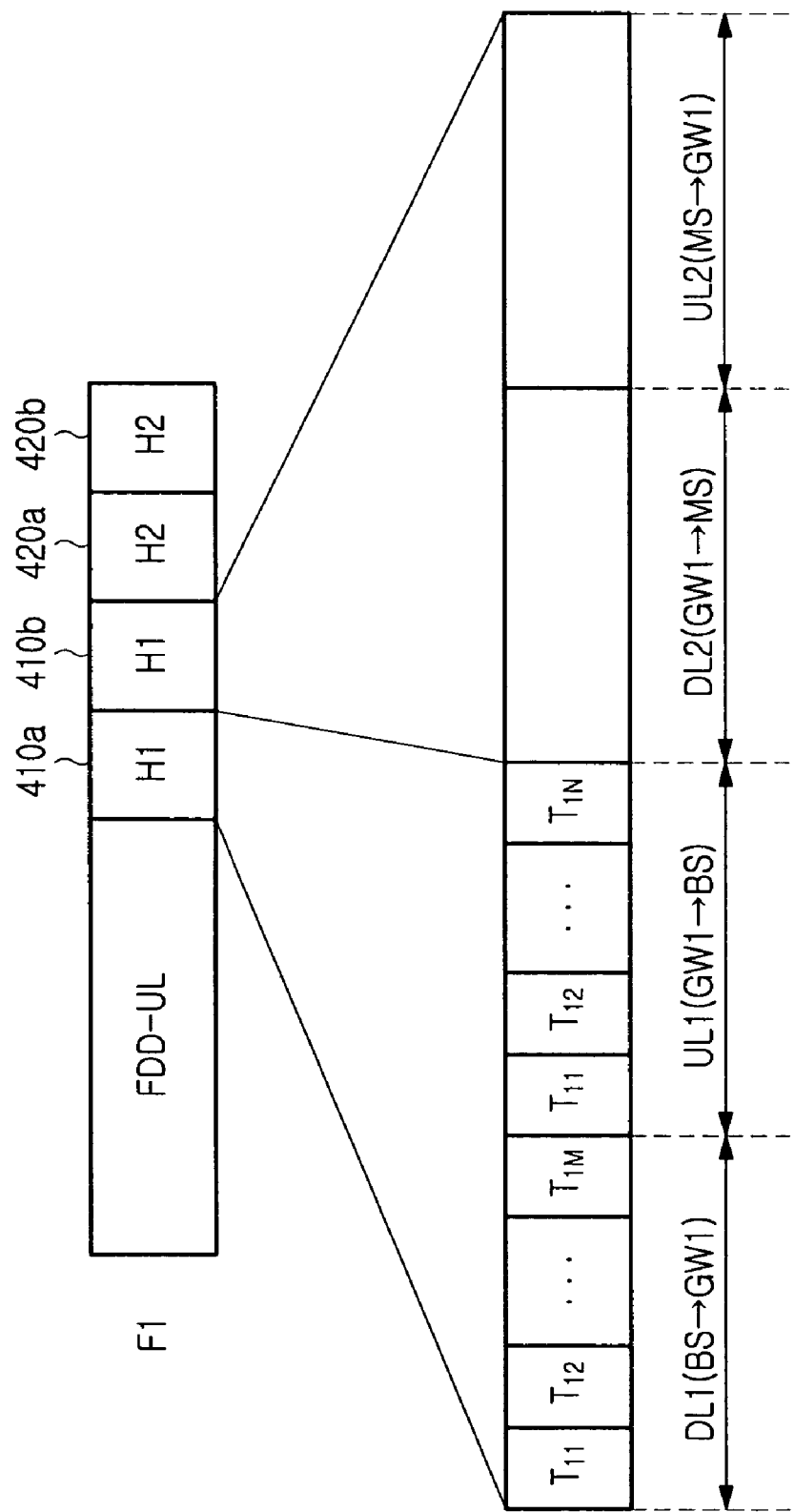
FIG. 4B shows a manner of using a frequency resource, which has been allocated to a specific satellite cell, according to the present invention.

FIG. 4B shows a manner of using a frequency resource, which has been allocated to a specific satellite cell. The manner of using frequency resources will be described with reference to a first satellite cell H1, together with a gateway 210 and a mobile station 211 for receiving data traffic, as shown in FIG. 2.

Referring to FIG. 4B, each of first and second time resources 410a and 410b, which have been allocated to the first satellite cell H1 from a first frequency resource F1, is divided into two ranges. Hereinafter, the first time resource 410a allocated to the first satellite cell H1 will be referred to as a preceding time resource, and the second time resource 410b as a following time resource.

The preceding time resource 410a consists of a first downlink DL1 and a first uplink UL1. The first downlink DL1 is a time resource allocated so as to transmit data from the base station 200 to the gateway GW1 or 210 of the first satellite cell H1. The first uplink UL1 is a time resource allocated so as to transmit data from the gateway 210 of the first satellite cell H1 to the base station 200. The base station 200 uses the first downlink DL1 and transmits data, which is to be transmitted to a mobile station for receiving data traffic, to the gateway 210. Therefore, data received by the gateway 210 is not limited to data traffic, which is to be directly received by the gateway 210, but includes data traffic to be transmitted to another mobile station belonging to the first satellite cell H1. This also holds true in the case of the first uplink UL1. Particularly, data traffic transmitted via the first uplink UL1 is not limited to data traffic to be transmitted from the gateway 210 to the base station 200, but includes data traffic to be received from a mobile station belonging to the first satellite cell H1 and transmitted to the base station 200.

Referring to FIG. 4B, the first downlink DL1 consists of M time slots, and the first uplink UL1 consists of N time slots. Particularly, the number M of time slots of the first downlink DL1 is different from that N of the first uplink UL1 in FIG. 4B. This is because of asymmetry of data traffic in the present invention. In general, a greater amount of data traffic exists in the downlink and a lesser amount of data traffic exists in the uplink. Depending on the ratio of data traffic between downlink and uplink, asymmetry may come into existence. For example, two or three times the amount of data traffic may be allocated to the downlink compared with the uplink, or vice versa. The asymmetry between the uplink and downlink causes the advantage of efficient utilization of limited resources.

The following time resource 410b, which has been allocated to the first satellite cell H1 from the first frequency resource F1, consists of a second downlink DL2 and a second uplink UL2. The second downlink DL2 is used to transmit data to a mobile station 211, which is to received data traffic from the gateway 210, or to a mobile station, via which data is transmitted to the mobile station 211. The second uplink UL2 is used to transmit traffic to the gateway 210, when a mobile station is to transmit data traffic to the base station 200. As in the case of the first downlink and uplink DL1 and UL1, the second downlink DL2 and uplink UL2 have a similar number of time slots.

An example of overall resource allocation will now be described.

Figure 4C:
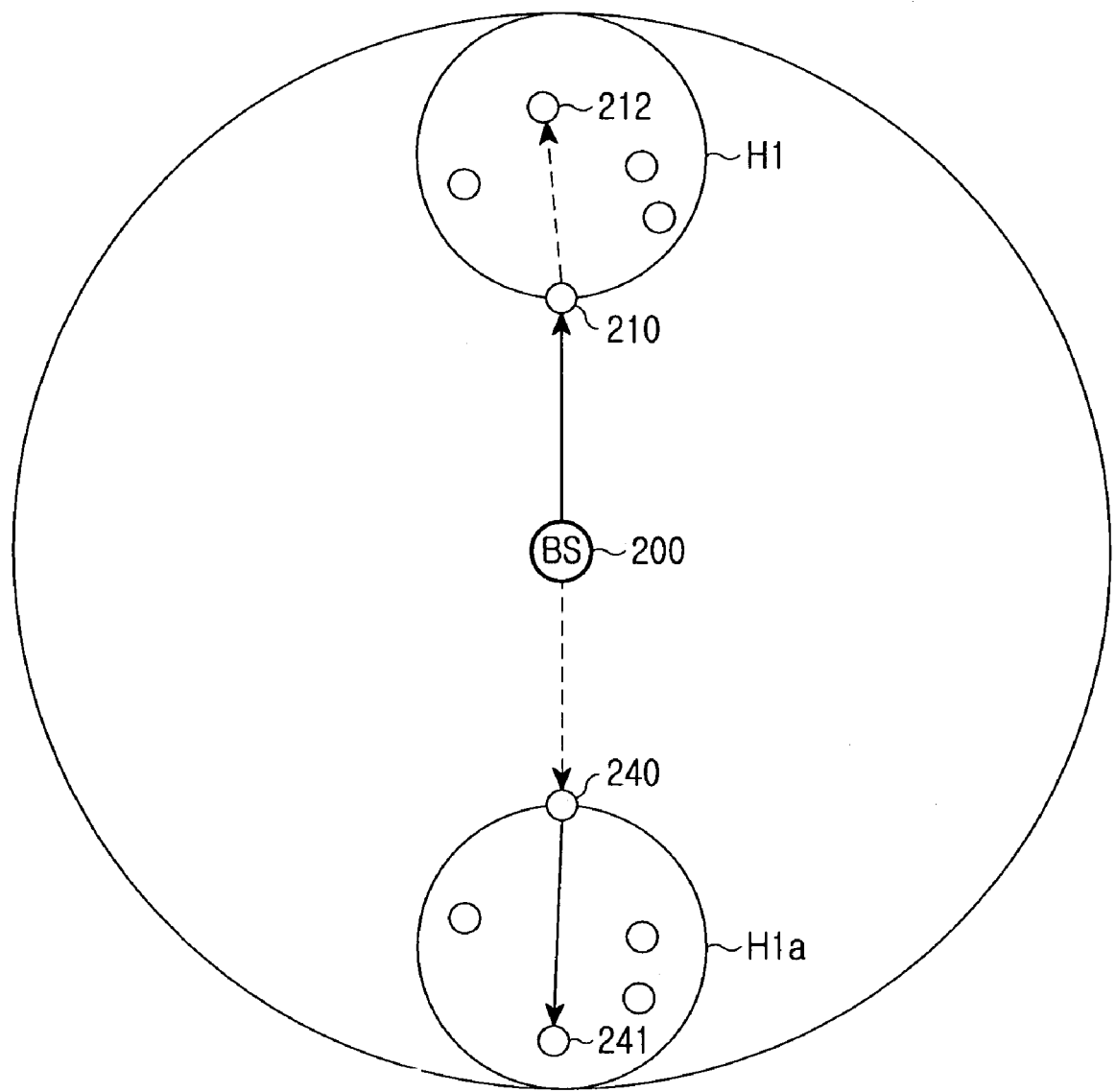
FIG. 4C is a conceptual diagram showing a resource allocation method for transmitting data traffic with minimum interference in a system according to the present invention.

FIG. 4C is a diagram showing a resource allocation method for transmitting data traffic with minimum interference in a system according to the present invention.

In FIG. 4C, a symmetric first satellite cell H1a is located with symmetry to the first satellite cell H1 about the base station 200. As used herein, the symmetric satellite cell refers to a satellite cell located in an area having the minimum interference with a specific satellite cell, based on the base station. Particularly, a satellite cell is regarded symmetric to a specific satellite cell, even when they are not completely symmetric to each other, as long as the interference between them is at a minimum. From a different point of view, when two satellite cells are spaced by at least two hops, they are regarded symmetric to each other. Applying this criterion to the arrangement shown in FIG. 2, the first, second, and third satellite cells H1, H2, and H3 are symmetric to satellite cells H1a, H2a, and H3a, respectively.

In order to transmit data traffic between symmetric satellite cells with minimum interference, resources are allocated on a disjointed time basis, as will now be described with reference to FIGS. 4A to 4C.

When the base station 200 needs to transmit data to a mobile station for receiving data traffic, which is located within the first satellite cell H1, the base station 200 transmits data traffic to the gateway 210 by using the preceding time resource 410a of the first frequency resource H1, particularly the first downlink DL1 thereof, as shown in FIG. 4B. The gateway 210 then transmits the data traffic to a mobile station 212 for receiving data traffic via the second downlink DL2 of the following time resource 410b.

When data traffic is to be transmitted to a mobile station 241 for receiving data traffic, which is located in the symmetric first satellite cell H1a, the first frequency resource F1 is allocated to the first satellite cell H1 in a manner different from that of the case shown in FIG. 4b. Links allocated to the first satellite cell H1 and those to the symmetric first satellite cell H1a will now be described.

When a first downlink DL1 is allocated in the first satellite cell H1, a second downlink DL2 is allocated in the symmetric satellite cell H1a. When a first uplink UL1 is allocated in the first satellite cell H1, a second uplink UL2 is allocated in the symmetric first satellite cell H1a. When a second downlink DL2 is allocated in the first satellite cell H1, a first downlink DL1 is allocated in the symmetric first satellite cell H1a. When a second uplink UL2 is allocated in the first satellite cell H1, a first uplink UL1 is allocated in the symmetric first satellite cell H1a.

Alternatively, when a first downlink DL1 is allocated in the first satellite cell H1, a second uplink UL2 is allocated in the symmetric first satellite cell H1a. When a first uplink UL1 is allocated in the first satellite cell H1, a second downlink DL2 is allocated in the symmetric first satellite cell H1a. When a second downlink DL2 is allocated in the first satellite cell H1, a first uplink UL1 is allocated in the symmetric first satellite cell H1a. When a second uplink UL2 is allocated in the first satellite cell H1, a first downlink DL1 is allocated in the symmetric first satellite cell H1a.

Both of the above methods are aimed at allocating resources with minimum interference between satellite cells in terms of distance, resource allocation, and power. As such, adoption of any of these methods for resource allocation improves the frequency reuse ratio.

It will be assumed in the following description that the first of both methods is adopted. Hereinafter, allocation of resources based on one of the methods will be referred to as symmetric resource allocation. Following this terminology, FIG. 4C shows an example of symmetric resource allocation according to the present invention.

Although it has been assumed so far that data traffic is directly transmitted from the base station to the gateway, as well as from the gateway to the destination mobile station, data traffic may also go through a number of mobile stations from the gateway to the destination mobile station, after being transmitted from the base station to the gateway. The latter case will now be described.

Figure 5:
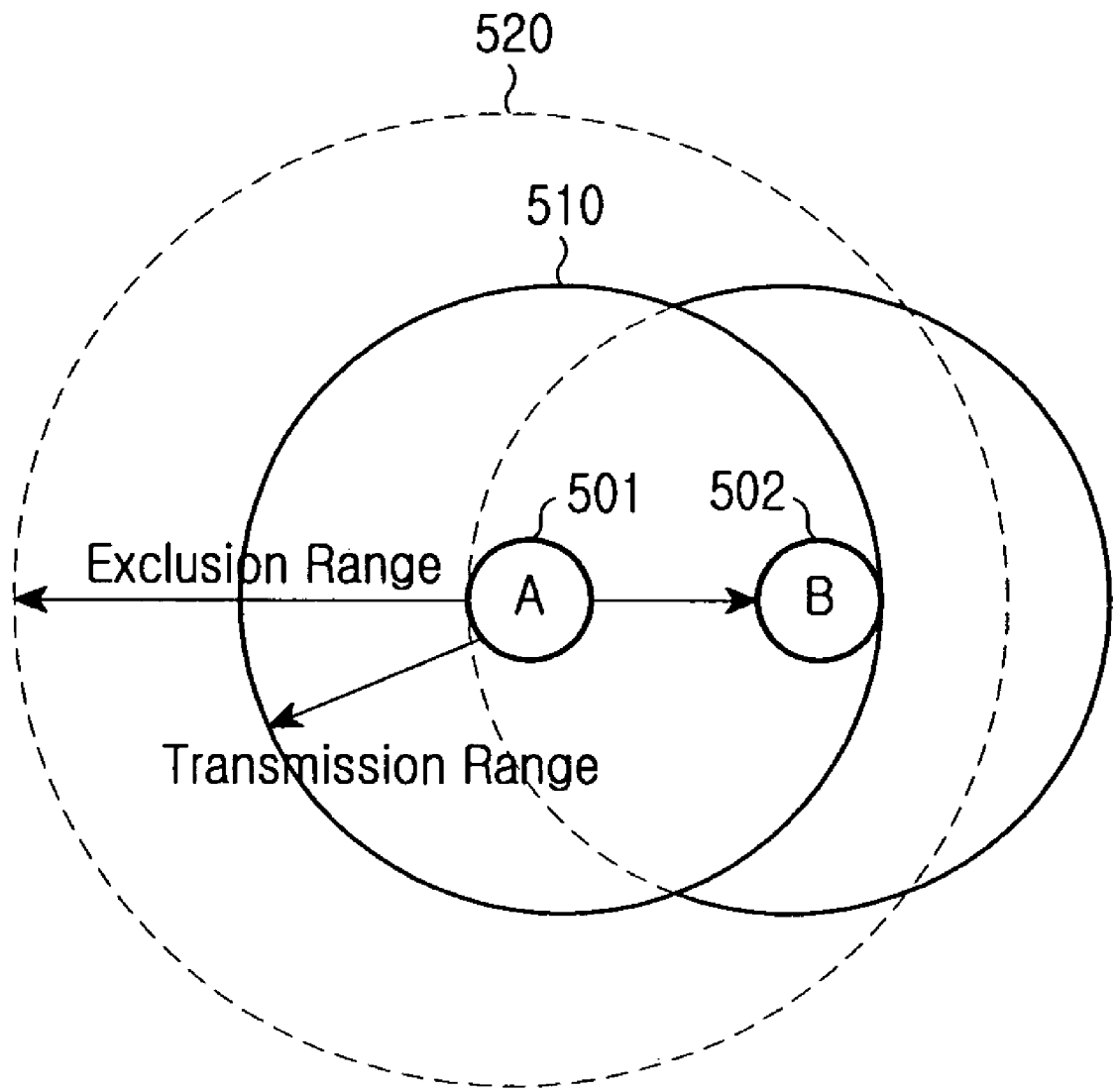
FIG. 5 is a diagram showing exclusion and transmission ranges according to the present invention.

FIG. 5 is a diagram showing exclusion and transmission ranges according to the present invention.

An exclusion range 520 and a transmission range 510 are shown in FIG. 5, when data traffic is transmitted from mobile station A 501 to mobile station B 502. The transmission range 510 will be described first. As used herein, the transmission range refers to the range of data transmission when data traffic is transmitted from the mobile station A 501 to the mobile station B 502 while maintaining a desired level of data transmission rate and service quality. When no directional antenna is used for wireless communication, traffic is generally transmitted radially as shown in FIG. 5. Within the transmission range 510, transmission of traffic from the mobile station A 501 to the mobile station B 502 satisfies a desired level of service quality and transmission rate. In this case, the mobile station A 501 transmits data traffic after determining the transmission power and transmission rate based on the location of the mobile station B 502. However, data traffic from the mobile station A 501 is not limited to the transmission range 510, but goes beyond it into a larger area. Such a range of transmission of data traffic from the mobile station A 501, to the extent that it may interfere with other mobile stations, is referred to as an exclusion range 520.

Figure 6:
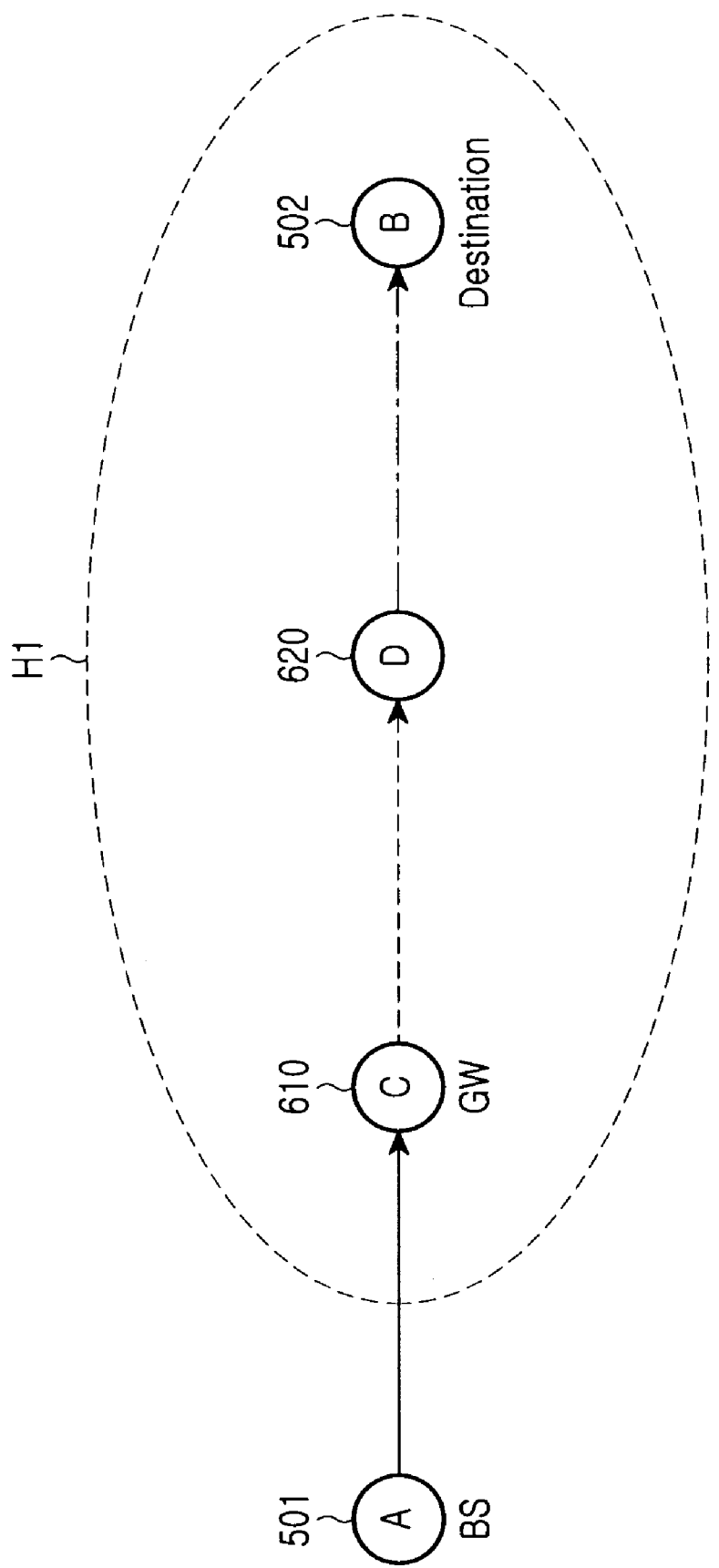
FIG. 6 shows an example of data traffic transmitted to a destination mobile station of a specific satellite cell in a multi-hop mode according to the present invention.

FIG. 6 shows an example of data traffic transmitted to a destination mobile station of a specific satellite cell in a multi-hop mode according to the present invention.

It is assumed in the description regarding FIG. 6 that the mobile station A 501 shown in FIG. 5 acts as a base station and destination mobile station B 502 is located within the first satellite cell H1. It is to be noted that the exclusion and transmission ranges are omitted in FIG. 6.

Referring to FIG. 6, the base station 501 transmits data traffic, which is to be sent to the destination mobile station B 502, to a gateway 601 of the first satellite cell H1 in the same transmission mode as mentioned above. Upon receiving data traffic from the base station 501, the gateway 610 of the first satellite cell H1 transmits the data traffic to a relay node 620 for relaying data traffic to the destination mobile station B 502. The relay node 620 then transmits the data traffic to the destination node 502. In this manner, the data traffic reaches the desired destination.

A process for transmitting data traffic from the gateway 610 to the destination node 502 via the relay node 620 will now be described with reference to FIG. 7.

Figure 7:
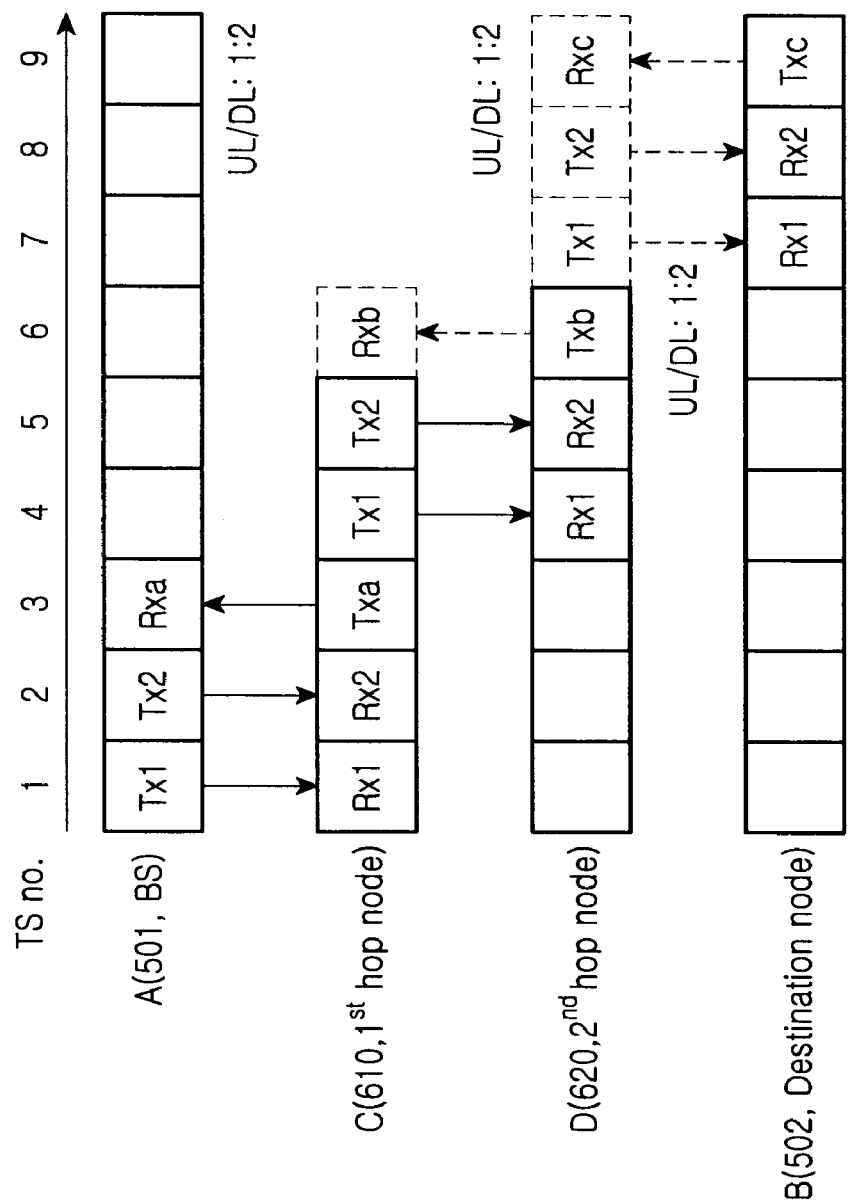
FIG. 7 is a timing diagram showing a process for transmitting data traffic to a destination node of a specific satellite cell via a relay node in a system according to the present invention.

FIG. 7 is a timing diagram showing a process for transmitting data traffic to a destination node of a specific satellite cell via a relay node in a system according to the present invention.

In FIG. 7, the number of time slots TS no. is given at the top of the drawing. In addition, it is assumed that the number of time slots gradually increases. It is to be noted that asymmetric services occur in the time slots shown in FIG. 7. The base station 501 transmits data traffic, which is to be sent to the destination node 502, to the gateway 610 during first and second time slots. Upon receiving the data traffic, the gateway 610 transmits necessary data traffic to the base station 502 during a third time slot. As mentioned above, the data traffic transmitted between the base station 501 and the gateway 610 during the first to third time slots include data traffic, which is transmitted to the base station from other mobile stations.

When the transmission of data traffic between the base station 501 and the gateway 610 is over, the gateway 610 extracts traffic, which is to be sent to the destination node 502, from received traffic and transmits the extracted traffic to the relay node 620. It is assumed for simplicity that all data corresponds to data traffic to be transmitted to the destination node 502. The transmission of data traffic between the gateway 610 and the relay node occurs during fourth and fifth time slots. When there exists data traffic to be transmitted from the destination node 502 to the base station, it is transmitted from the relay node 620 to the gateway 610 during a sixth time slot. After the transmission of data transmission from the relay node 620 to the gateway 610 during the sixth time slot, the relay node 620 re-transmits data traffic during seventh and eighth time slots to the destination node 502. When there exists data traffic to be transmitted from the destination node 502 to the base station 501, it is supposed to be transmitted to the relay node 620 during a ninth time slot.

Although it has been assumed in the above description that the time slots of downlink and uplink between respective nodes have an asymmetric ratio of 2:1, the ratio is not limited to that in the present invention. The asymmetry is merely based on characteristics of general data traffic. The ratio of allocated time slots may vary depending on the amount of data traffic, such as 1:2 or 3:1.

Figure 8A:
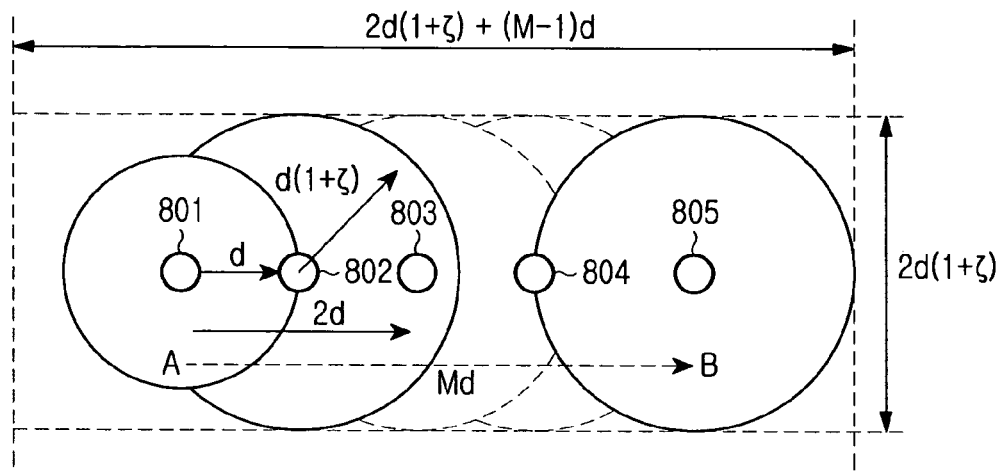
FIG. 8A shows the relationship between distance and hop when data is transmitted in a multi-hop mode according to the present invention.

FIG. 8A shows the relationship between distance and hop when data is transmitted in a multi-hop mode according to the present invention.

In FIG. 8A, node A 801 transmits a data transmission, and node B 805 is the destination of the data traffic. Intermediate nodes 802, 803, and 804 are relay nodes for relaying traffic. It is assumed that the distance from the node A 801 to the first relay node 802 is d; the distance between the relay nodes is also d; and the distance between the final relay node 804 and the destination node B 805 is also d. If the number of hops between the node A 801 and the destination node 805 is M, the distance between the node A 801 and the destination node 805 is Md. As such, the distance between the nodes, d, corresponds to the maximum distance of the transmission range described with reference to FIG. 5. The exclusion range, which is greater than the transmission range, can be defined by Equation (1) below.

$$\text{Exclusion range} = d(1+\zeta) \quad (1)$$

Wherein, d is the distance between nodes, as well as the maximum distance of the data transmission range. Therefore, 2d corresponds to the distance between two nodes and may be a diameter about the center of the first relay node 802. When there are M hops, the exclusion range from the node A 801, which transmits data traffic, to the destination node B 805 is defined by Equation (2) below.

Exclusion range from traffic transmission node to destination node=$2d(1+\zeta)+(M-2)d$ (2)

In Equation (2), the exclusion range is obtained as follows: counting begins from the first node and, since the last node is a reception node, the number of hops is reduced by two.

Assuming that the time slot is $t_{sl}$ and the exclusion range is E, the ratio of the time slot to the exclusion ratio is referred to as a traffic transmission ratio δ and is defined by Equation (3) below.

$$\delta = \frac{t_{sl}}{E} \quad (3)$$

In the case of operation in a multi-hop mh mode, as shown in FIG. 8A, the traffic density is defined by Equation (4) below.

$$\delta_{mh} = \frac{t_{sl}}{M\pi d^2(1+\xi)^2} \quad (4)$$

When specific data is transmitted from each transmitter, i.e. base station to a destination node in a multi-hop mode, the time of data transmission between respective nodes occupies a very small portion of an entire frame time. Therefore, when the channel reuse efficiency is defined as the ratio of traffic density to occupied range, the channel reuse efficiency in a multi-hop mode is defined by Equation (5) below.

$$\eta_{mh} = \frac{M\pi d^2(1+\xi)^2}{t_{sl}(2d(1+\xi)+(M-2)d)(2d(1+\xi))}$$

$$= \frac{M\pi d^2(1+\xi)^2}{t_{sl}(4d^2(1+\xi)^2+2d^2(1+\xi)(M-2))}$$

$$= \frac{1}{t_{sl}\left(\left(\frac{4}{M\pi}\right)+\frac{2(M-2)}{M\pi(1+\xi)}\right)} \quad (5)$$

Transmission in a single-hop mode, particularly, direction transmission from the base station to a destination will now be described.

Figure 8B:
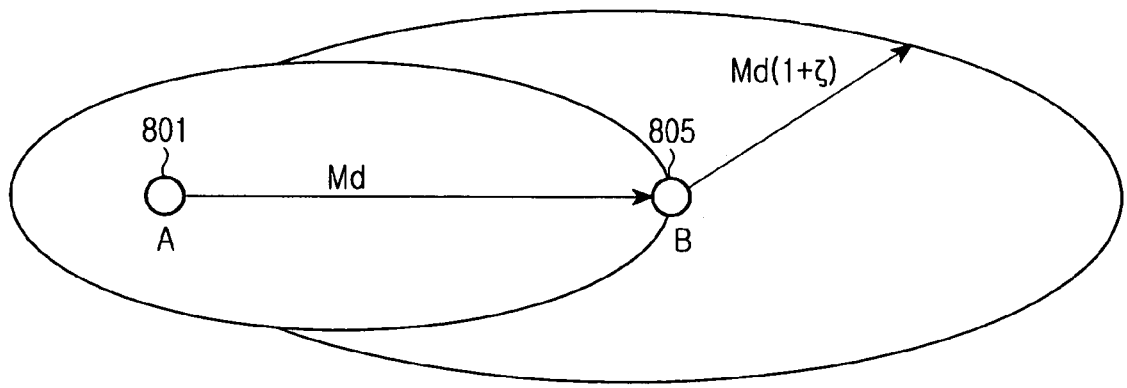
FIG. 8B shows the distance of an exclusion range on the assumption of direction transmission.

FIG. 8B shows the distance of an exclusion range on the assumption of direction transmission.

No relay node exists in the case of a single hop. This means that the number of hops is 1 on the assumption of direction transmission, as shown in FIG. 8B. Since the transmission distance in FIG. 8B is the same as that in FIG. 8A, the distance between the base station 801 and the destination mobile station 805 is Md. As a result, the range of transmission of data from the base station 801 to the destination mobile station 805 is defined as the transmission range, and the exclusion range is defined by Equation (6) below.

Exclusion range from traffic transmission node to destination node=$Md(1+\zeta)$ (6)

It is clear from comparison between Equations (2) and (6), i.e. between FIGS. 8A and 8B, that the exclusion range of FIG. 8A is less than that of FIG. 8B. Such a small exclusion range means little or no interference with other mobile stations and high throughput.

In the case of a single hop, the exclusion range is valid throughout the entire time slot. Therefore, the channel reuse ratio and traffic density for a single hop sh are defined by Equations (7) and (8) below, respectively.

$$\eta = \frac{1}{t_{sl}} \quad (7)$$

$$\delta_{sh} = \frac{t_{sl}}{M^2\pi d^2(1+\xi)^2} \quad (8)$$

The ratio of multi-hop channel reuse ratio to single-hop channel reuse ratio is defined by Equation (9) below.

$$\eta = \frac{\eta_{mh}}{\eta_{sh}}$$

$$= \frac{1}{t_{sl}\left(\left(\frac{4}{M\pi}\right)+\frac{2(M-2)}{M\pi(1+\xi)}\right)} \quad (9)$$

It is clear from that, when a system uses multiple hops, the reuse ratio increases. When the number of hops increases infinitely, the result is defined by Equation (10) below.

$$\lim_{M \to \infty} \eta(M) = \frac{\pi(1+\xi)}{2} \quad (10)$$

It is clear from Equation (10) that, as the number of hops increases, the throughput of a cellular system is improved.

Figure 9:
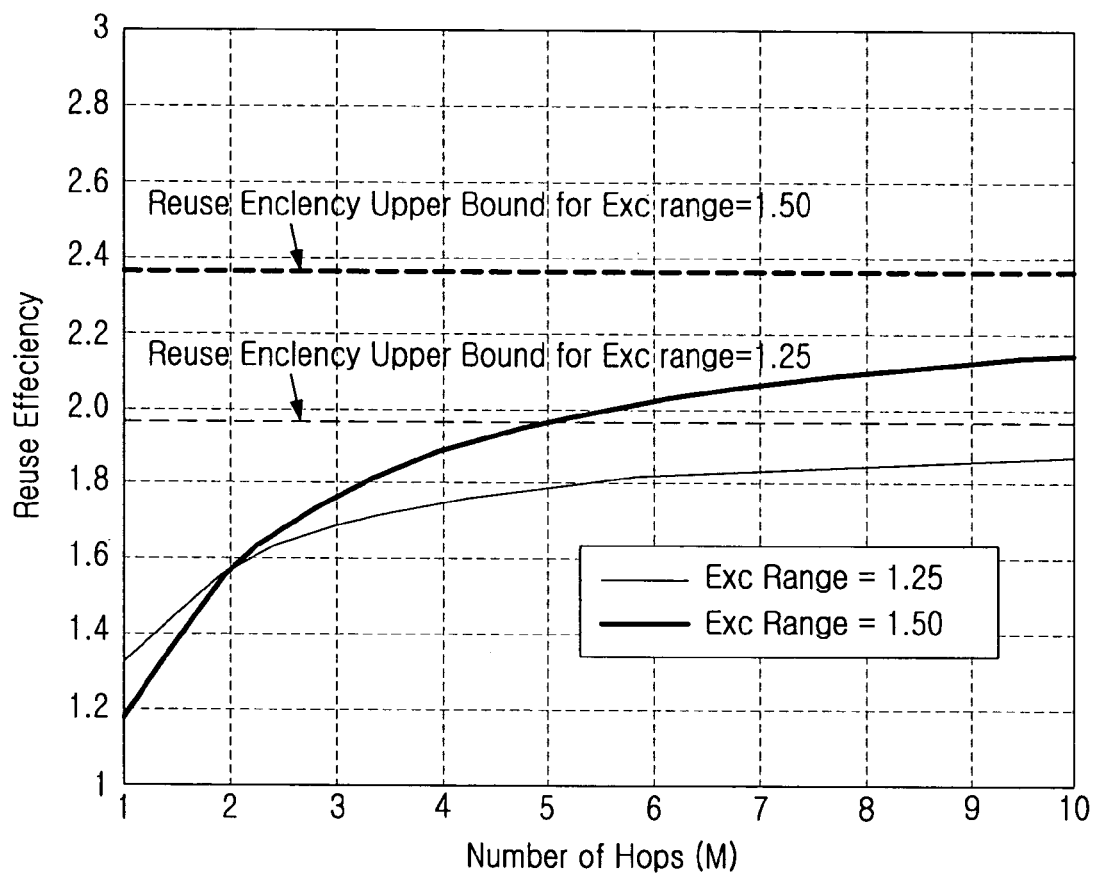
FIG. 9 is a graph showing the relationship between number of hops and reuse efficiency when a multi-hop mode according to the present invention is adopted.

FIG. 9 is a graph showing the relationship between number of hops and reuse efficiency when a multi-hop mode according to the present invention is adopted.

Two different graphs are superimposed in FIG. 9. One of them corresponds to a case wherein the exclusion range is 1.25 times the transmission range, and the other corresponds to a case wherein the exclusion range is 1.5 times the transmission range. In both cases, the reuse efficiency increases in proportion to the number of hops. It is clear from FIG. 9 that, when the exclusion range is 1.25 times the transmission range, the reuse efficiency is increased by about two times compared with the case of a single hop mode and, when the exclusion range is 1.5 times the transmission range, the reuse efficiency is increased by about 2.4 times compared with the case of a single hop mode.

It is clear form the graph that, in order to guarantee adequate efficiency, the number of hops should be at least 3 or 4.

As mentioned above, the present invention is advantageous in that it provides a hybrid wireless communication system which can be operated in different modes while increasing the resource reuse efficiency and throughput.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hybrid wireless communication system supporting a time division duplexing (TDD) mode and a frequency division duplexing (FDD) mode, the system comprising:
   a base station having a cellular communication range based on a cellular mode;

the base station determining a location of a switching time of each frame based on the amount of traffic necessary for each of a real-time service and non-real-time service; and a plurality of mobile stations within the cellular communication range, wherein the base station is configured to divide each available frequency resource into frames for communication, each frame switches between a real-time service mode and a non-real-time service mode at the switching time within the frame, communication is performed with the plurality of mobile stations via an uplink and a downlink in the real-time service mode of each frame according to the cellular mode based on the FDD mode, and communication is performed with the plurality of mobile stations via the uplink and the downlink in the non-real-time service mode of each frame according to an ad hoc mode based on the TDD mode, and wherein the base station is configured to vary the location of the switching time of each frame based on the amount of traffic necessary for each of a real-time service and a non-real-time service, the base station communicates directly with a target mobile station in the FDD mode and the base station communicates with the target mobile station via at least one relay node in the TDD mode, time slots of the uplink and the downlink have an asymmetric ratio or a symmetric ratio depending on the amount of traffic necessary for each of the uplink and the downlink and the base station broadcasts the switching time to each of the plurality of mobile stations.

2. The system as claimed in claim 1, wherein the base station designates one of the plurality of mobile stations spaced a predetermined distance from the base station as a gateway of a satellite cell in the non-real-time service mode and, after data is transmitted to the gateway, the base station functions as a gateway in the ad hoc mode with regard to mobile stations in a selected range adjacent to the base station.

3. The system as claimed in claim 1, wherein, when communication is performed in the ad hoc mode, satellite cells are constructed according to a distance from the base station to the plurality of mobile stations, a degree of closeness among the plurality of mobile stations, and a positional relationship among closely located mobile stations, and an identical frequency resource is allocated to the constructed satellite cells, a hop distance between the satellite cells being at least 2.

4. The system as claimed in claim 3, wherein a time slot is allocated to the satellite cells, the identical frequency resource having been allocated to the satellite cells, in a symmetric resource allocation method.

5. A communication method of a base station in a hybrid wireless communication system supporting a time division duplexing (TDD) mode and a frequency division duplexing (FDD) mode, the method comprising the steps of:
dividing each available frequency resource into frames;
determining a location of a switching time of each frame based on the amount of traffic necessary for each of a real-time service and a non-real-time service;
setting each frame so that the frame switches between a real-time service mode and a non-real-time service mode at the switching time within the frame;
communicating with a plurality of mobile stations within a cellular communication range, based on a cellular mode, of the base station via an uplink and a downlink in the real-time service mode of each frame according to the cellular mode based on the FDD mode; and communicating with the plurality of mobile stations via the uplink and the downlink in the non-real-time service mode of each frame according to an ad hoc mode based on the TDD mode, wherein the location of the switching time of each frame is varied based on the amount of traffic necessary for each of the real-time service and the non-real-time service, the base station communicates directly with a target mobile station in the FDD mode and the base station communicates with the target mobile station via at least one relay node in the TDD mode, time slots of the uplink and the downlink have an asymmetric ratio or a symmetric ratio depending on the amount of traffic necessary for each of the uplink and the downlink and the base station broadcasts the switching time to each of the plurality of mobile stations.

6. The method as claimed in claim 5, further comprising:
designating one of the plurality of mobile stations spaced a predetermined distance from the base station as a gateway of a satellite cell in the non-real-time service mode; and
operating the base station as a gateway in the ad hoc mode with regard to mobile stations in a selected range adjacent to the base station after data is transmitted to the gateway of the satellite cell in the non-real-time service mode.

7. The method as claimed in claim 5, wherein, when communication is performed in the ad hoc mode, satellite cells are constructed according to a distance from the base station to the plurality of mobile stations, a degree of closeness among the plurality of mobile stations, and a positional relationship among closely located mobile stations, and an identical frequency resource is allocated to the constructed satellite cells, a hop distance between the satellite cells being at least 2.

8. The method as claimed in claim 7, wherein a time slot is allocated to the satellite cells, the identical frequency resource having been allocated to the satellite cells, in a symmetric resource allocation method.

9. A communication method of a mobile station in a hybrid wireless communication system supporting a time division duplexing (TDD) mode and a frequency division duplexing (FDD) mode, the method comprising the steps of:
communicating with a base station having a cellular communication range based on a cellular mode via an uplink and a downlink in a real-time service mode according to the cellular mode based on the FDD mode, on a first part of a frame;
acquiring a location of a switching time of each frame determined based on the amount of traffic necessary for each of a real-time service and a non-real-time service; and
communicating with the base station via the uplink and the downlink in a non-real-time service mode according to an ad hoc mode based on the TDD mode, on another part of the frame separated from the first part of the frame by a switching time,
wherein the location of the switching time of the frame is varied based on the amount of traffic necessary for each of the real-time service and the non-real-time service, the base station communicates directly with a target mobile station in the FDD mode and the base station communicates with the target mobile station via at least one relay node in the TDD mode, time slots of the uplink and the downlink have an asymmetric ratio or a symmetric ratio depending on the amount of traffic necessary for each of the uplink and the downlink and the base station broadcasts the switching time to each of all mobile stations within the cellular communication range.

10. The method as claimed in claim 9, wherein one of a plurality of mobile stations spaced a predetermined distance from the base station is designated as a gateway of a satellite cell in the non-real-time service mode, and the base station is operated as a gateway in the ad hoc mode with regard to mobile stations in a selected range adjacent to the base station after data is transmitted to the gateway of the satellite cell in the non-real-time service mode.

11. The method as claimed in claim 9, wherein, when communication is performed in the ad hoc mode, satellite cells are constructed according to a distance from the base station to the plurality of mobile stations, a degree of closeness among the plurality of mobile stations, and a positional relationship among closely located mobile stations, and an identical frequency resource is allocated to the constructed satellite cells, a hop distance between the satellite cells being at least 2.

12. The method as claimed in claim 11, wherein a time slot is allocated to the satellite cells, the identical frequency resource having been allocated to the satellite cells, in a symmetric resource allocation method.

* * * * *